(12) United States Patent
Parsons

(10) Patent No.: US 8,899,318 B1
(45) Date of Patent: Dec. 2, 2014

(54) APPLYING AN AGGREGATE TO EXPANDABLE TUBULAR

(71) Applicant: Ronald C. Parsons and Denise M. Parsons, trustees under the Ronald C. Parsons and Denise M., Houston, TX (US)

(72) Inventor: Ronald C. Parsons, Houston, TX (US)

(73) Assignee: Ronald C. Parsons, Houston, TX (US)

( * ) Notice: Subject to any disclaimer, the term of this patent is extended or adjusted under 35 U.S.C. 154(b) by 0 days.

(21) Appl. No.: 14/322,336

(22) Filed: Jul. 2, 2014

Related U.S. Application Data

(60) Provisional application No. 61/983,664, filed on Apr. 24, 2014.

(51) Int. Cl.
| | | |
|---|---|---|
| *E21B 43/10* | (2006.01) | |
| *F16L 9/16* | (2006.01) | |
| *B29C 63/06* | (2006.01) | |
| *B29L 23/00* | (2006.01) | |

(52) U.S. Cl.
CPC . *F16L 9/16* (2013.01); *B29C 63/06* (2013.01); *B29L 2023/22* (2013.01)
USPC .......................... 166/207; 166/206; 166/242.1

(58) Field of Classification Search
USPC .............. 166/207, 206, 242.1; 428/36.91, 58, 428/143, 150
See application file for complete search history.

(56) References Cited

U.S. PATENT DOCUMENTS

| | | | |
|---|---|---|---|
| 4,050,121 A | 9/1977 | Richman | |
| 4,146,060 A | 3/1979 | Garrett | |
| 4,171,560 A | 10/1979 | Garrett | |
| 4,358,489 A | 11/1982 | Green | |
| 4,639,388 A | 1/1987 | Ainsworth et al. | |
| 4,699,146 A | 10/1987 | Sieverding | |
| 4,750,482 A | 6/1988 | Sieverding | |
| 4,795,510 A | 1/1989 | Wittrock et al. | |
| 4,846,185 A | 7/1989 | Carim | |
| 5,031,401 A | 7/1991 | Hinderks | |
| 5,091,447 A | 2/1992 | Lomasney | |
| 5,213,589 A | 5/1993 | Ronning et al. | |
| 5,427,849 A | 6/1995 | McClintock et al. | |
| 5,506,046 A | 4/1996 | Andersen et al. | |
| 5,580,409 A | 12/1996 | Andersen et al. | |
| 5,616,672 A | 4/1997 | O'Brien et al. | |
| 5,634,283 A | 6/1997 | Kastner | |
| 5,665,439 A | 9/1997 | Andersen et al. | |
| 5,667,542 A | 9/1997 | Law et al. | |
| 5,679,381 A | 10/1997 | Andersen et al. | |

(Continued)

*Primary Examiner* — Nicole Coy
(74) *Attorney, Agent, or Firm* — Timothy S. Westby; Porter Hedges, LLP

(57) ABSTRACT

Herein disclosed is a method of applying at least one aggregate to a tubular, comprising attaching the at least one aggregate to a flexible sheet; wrapping the flexible sheet around the tubular with the at least one aggregate between the sheet and tubular. Herein also disclosed is an assembly comprising a tubular, at least one aggregate, and a flexible sheet wrapped around the tubular with the at least one aggregate between the tubular and the sheet. In an embodiment, the at least one aggregate is adhered to the sheet by a first adhesive and the at least one aggregate is adhered to the tubular by a second adhesive, wherein the second adhesive has a higher adhering strength than the first adhesive. In an embodiment, the flexible sheet is removed and the at least one aggregate remains attached to the tubular. The use of such an assembly is discussed.

17 Claims, 2 Drawing Sheets

(56) References Cited

U.S. PATENT DOCUMENTS

| | | | |
|---|---|---|---|
| 5,681,612 | A | 10/1997 | Benedict et al. |
| 5,704,952 | A | 1/1998 | Law et al. |
| 5,705,238 | A | 1/1998 | Andersen et al. |
| 5,709,913 | A | 1/1998 | Andersen et al. |
| 5,754,269 | A | 5/1998 | Benjamin et al. |
| 5,763,075 | A | 6/1998 | Benjamin et al. |
| 5,763,555 | A | 6/1998 | Skoglund |
| 5,766,277 | A | 6/1998 | DeVoe et al. |
| 5,800,647 | A | 9/1998 | Andersen et al. |
| 5,803,176 | A | 9/1998 | Blizzard et al. |
| 5,827,390 | A | 10/1998 | Benjamin et al. |
| 5,830,548 | A | 11/1998 | Andersen et al. |
| 5,861,211 | A | 1/1999 | Thakkar et al. |
| 5,863,847 | A | 1/1999 | DeVoe et al. |
| 5,870,955 | A | 2/1999 | Williams et al. |
| 5,882,771 | A | 3/1999 | Klein et al. |
| 5,888,607 | A | 3/1999 | Seth et al. |
| 5,916,017 | A | 6/1999 | Sedlock |
| 5,916,641 | A | 6/1999 | McArdle et al. |
| 5,919,563 | A | 7/1999 | Parish, Jr. et al. |
| 5,922,784 | A | 7/1999 | DeVoe et al. |
| 5,924,917 | A | 7/1999 | Benedict et al. |
| 5,928,741 | A | 7/1999 | Andersen et al. |
| 5,954,844 | A | 9/1999 | Law et al. |
| 6,008,181 | A | 12/1999 | Cripe et al. |
| 6,015,781 | A | 1/2000 | Vinson et al. |
| 6,020,303 | A | 2/2000 | Cripe et al. |
| 6,022,050 | A | 2/2000 | Kline |
| 6,024,019 | A | 2/2000 | Williams et al. |
| 6,036,313 | A | 3/2000 | Benjamin et al. |
| 6,039,911 | A | 3/2000 | Miller et al. |
| 6,060,443 | A | 5/2000 | Cripe et al. |
| 6,077,601 | A | 6/2000 | DeVoe et al. |
| 6,093,856 | A | 7/2000 | Cripe et al. |
| 6,099,457 | A | 8/2000 | Good |
| 6,107,366 | A | 8/2000 | Benjamin et al. |
| 6,126,528 | A | 10/2000 | Sedlock |
| 6,133,222 | A | 10/2000 | Vinson et al. |
| 6,150,002 | A | 11/2000 | Varona |
| 6,153,577 | A | 11/2000 | Cripe et al. |
| 6,228,829 | B1 | 5/2001 | Vinson et al. |
| 6,231,922 | B1 | 5/2001 | Kline |
| 6,233,424 | B1 | 5/2001 | Mohri et al. |
| 6,235,363 | B1 | 5/2001 | Bilodeau |
| 6,242,406 | B1 | 6/2001 | Katsuda et al. |
| 6,258,138 | B1 | 7/2001 | DeVoe et al. |
| 6,312,788 | B1 | 11/2001 | Mohri et al. |
| 6,315,648 | B1 | 11/2001 | Neer |
| 6,326,348 | B1 | 12/2001 | Vinson et al. |
| 6,359,027 | B1 | 3/2002 | Dahlke et al. |
| 6,368,097 | B1 | 4/2002 | Miller et al. |
| 6,368,838 | B1 | 4/2002 | Singhvi et al. |
| 6,372,336 | B1 | 4/2002 | Clausen et al. |
| 6,419,729 | B1 | 7/2002 | Duffy et al. |
| 6,448,213 | B1 | 9/2002 | Willman |
| 6,461,709 | B1 | 10/2002 | Janssen et al. |
| 6,465,076 | B2 | 10/2002 | Larson et al. |
| 6,482,488 | B1 | 11/2002 | Janssen et al. |
| 6,503,620 | B1 | 1/2003 | Xie et al. |
| 6,524,681 | B1 | 2/2003 | Seitz et al. |
| 6,541,098 | B2 | 4/2003 | Venkatasanthanam et al. |
| 6,541,109 | B1 | 4/2003 | Kumar et al. |
| 6,547,887 | B1 | 4/2003 | Ko et al. |
| 6,580,035 | B1 | 6/2003 | Chung |
| 6,586,510 | B1 | 7/2003 | Brown et al. |
| 6,589,317 | B2 | 7/2003 | Zhang et al. |
| 6,596,120 | B2 | 7/2003 | Davis et al. |
| 6,615,006 | B2 | 9/2003 | Michlin et al. |
| 6,648,638 | B2 | 11/2003 | Castro et al. |
| 6,666,811 | B1 | 12/2003 | Good |
| 6,676,646 | B2 | 1/2004 | Bast et al. |
| 6,677,028 | B1 | 1/2004 | Lasch et al. |
| 6,769,969 | B1 | 8/2004 | Duescher |
| 6,777,055 | B2 | 8/2004 | Janssen et al. |
| 6,780,096 | B1 | 8/2004 | Brown et al. |
| 6,797,371 | B1 | 9/2004 | Gehlsen et al. |
| 6,805,722 | B2 | 10/2004 | Hunt et al. |
| 6,849,057 | B2 | 2/2005 | Satou et al. |
| 6,864,322 | B2 | 3/2005 | Gehlsen et al. |
| 6,866,383 | B2 | 3/2005 | Naik et al. |
| 6,893,722 | B2 | 5/2005 | McGee |
| 6,908,457 | B2 | 6/2005 | Bast et al. |
| 6,919,504 | B2 | 7/2005 | McCutcheon et al. |
| 6,938,390 | B2 | 9/2005 | Maeda et al. |
| 6,997,266 | B2 * | 2/2006 | Jackson et al. ................. 166/384 |
| 7,066,284 | B2 | 6/2006 | Wylie et al. |
| 7,067,306 | B2 | 6/2006 | Singhvi et al. |
| 7,070,850 | B2 | 7/2006 | Dietz et al. |
| 7,094,748 | B2 | 8/2006 | Ofosu-Asante et al. |
| 7,117,827 | B1 | 10/2006 | Hinderks |
| 7,132,161 | B2 | 11/2006 | Knowles et al. |
| 7,165,888 | B2 | 1/2007 | Rodick |
| 7,166,570 | B2 | 1/2007 | Hunter et al. |
| 7,208,222 | B2 | 4/2007 | Rolfe et al. |
| 7,225,879 | B2 | 6/2007 | Wylie et al. |
| 7,231,984 | B2 | 6/2007 | Jaensch |
| 7,331,311 | B2 | 2/2008 | Hurwitz |
| 7,334,650 | B2 | 2/2008 | Giroux et al. |
| 7,341,117 | B2 | 3/2008 | Wylie et al. |
| 7,342,056 | B2 | 3/2008 | Patel et al. |
| 7,395,882 | B2 | 7/2008 | Oldham et al. |
| 7,399,919 | B2 | 7/2008 | McCutcheon et al. |
| 7,402,022 | B2 | 7/2008 | Harper et al. |
| 7,410,791 | B2 | 8/2008 | Singhvi et al. |
| 7,438,027 | B1 | 10/2008 | Hinderks |
| 7,464,658 | B2 | 12/2008 | Dhellemmes et al. |
| 7,479,157 | B2 | 1/2009 | Weber et al. |
| 7,520,800 | B2 | 4/2009 | Duescher |
| 7,524,910 | B2 | 4/2009 | Jisng et al. |
| 7,571,777 | B2 | 8/2009 | Wylie et al. |
| 7,632,434 | B2 | 12/2009 | Duescher |
| 7,686,089 | B2 * | 3/2010 | Howlett et al. ................. 166/382 |
| 7,732,039 | B2 | 6/2010 | Chakravarty et al. |
| 7,785,684 | B2 | 8/2010 | Halle |
| 7,823,660 | B2 | 11/2010 | Giroux et al. |
| 7,860,545 | B2 | 12/2010 | Shults et al. |
| RE42,048 | E | 1/2011 | Gehlsen et al. |
| 7,879,441 | B2 | 2/2011 | Gehlsen et al. |
| 7,900,794 | B2 | 3/2011 | Dhellemmes et al. |
| 7,935,215 | B2 | 5/2011 | Husemann et al. |
| 7,984,684 | B2 | 7/2011 | Hinderks |
| 7,989,051 | B2 | 8/2011 | Moresco et al. |
| 7,993,905 | B2 | 8/2011 | Singhvi et al. |
| 8,006,785 | B2 | 8/2011 | Oldham et al. |
| 8,011,446 | B2 | 9/2011 | Wylie et al. |
| 8,042,616 | B2 | 10/2011 | Giroux et al. |
| 8,062,098 | B2 | 11/2011 | Duescher |
| 8,074,749 | B2 | 12/2011 | Twardowski et al. |
| 8,127,868 | B2 | 3/2012 | Giroux et al. |
| 8,162,067 | B2 * | 4/2012 | Ring et al. .................... 166/384 |
| 8,167,059 | B2 | 5/2012 | Oldham et al. |
| 8,205,693 | B2 | 6/2012 | Oldham et al. |
| 8,225,887 | B2 | 7/2012 | Oldham et al. |
| 8,225,888 | B2 | 7/2012 | Oldham et al. |
| 8,252,475 | B2 | 8/2012 | Kobuchi et al. |
| 8,297,380 | B2 | 10/2012 | Oldham et al. |
| 8,375,666 | B2 | 2/2013 | Stahl et al. |
| 8,528,669 | B2 | 9/2013 | Twardowski et al. |
| 8,530,037 | B2 | 9/2013 | Halle |
| 8,534,379 | B2 | 9/2013 | Giroux et al. |
| 8,548,557 | B2 | 10/2013 | Garstka et al. |
| 8,555,860 | B2 | 10/2013 | McAlister |
| 8,585,753 | B2 | 11/2013 | Scanlon et al. |
| 8,643,194 | B2 | 2/2014 | Takamoto et al. |
| 8,673,428 | B2 | 3/2014 | Naoyuki et al. |
| 2002/0007910 | A1 | 1/2002 | Bennett et al. |
| 2002/0019206 | A1 | 2/2002 | Deka et al. |
| 2003/0073599 | A1 | 4/2003 | Willman et al. |
| 2003/0119400 | A1 | 6/2003 | Beitz et al. |
| 2003/0119402 | A1 | 6/2003 | Melius et al. |
| 2003/0119405 | A1 | 6/2003 | Abuto et al. |
| 2003/0119413 | A1 | 6/2003 | Chakravarty et al. |
| 2004/0042965 | A1 | 3/2004 | Usui et al. |
| 2004/0140086 | A1 * | 7/2004 | Tran et al. ....................... 166/55 |

(56) References Cited

U.S. PATENT DOCUMENTS

| | | |
|---|---|---|
| 2004/0204698 A1 | 10/2004 | Zenker et al. |
| 2005/0148258 A1 | 7/2005 | Chakravarty et al. |
| 2005/0167026 A1 | 8/2005 | Dronzek et al. |
| 2005/0271864 A1 | 12/2005 | van Driesten |
| 2006/0096209 A1 | 5/2006 | Dhellemmes et al. |
| 2006/0099338 A1 | 5/2006 | Boelz et al. |
| 2006/0099550 A1 | 5/2006 | Faasse et al. |
| 2007/0098148 A1 | 5/2007 | Sherman |
| 2007/0212520 A1 | 9/2007 | Furumori et al. |
| 2007/0241306 A1 | 10/2007 | Wehner et al. |
| 2007/0248810 A1 | 10/2007 | McGee et al. |
| 2008/0078500 A1 | 4/2008 | Sher et al. |
| 2008/0233180 A1 | 9/2008 | Zeltman et al. |
| 2010/0143724 A1 | 6/2010 | Johnson et al. |
| 2010/0210745 A1 | 8/2010 | McDaniel et al. |
| 2010/0233146 A1 | 9/2010 | McDaniel et al. |
| 2011/0086329 A1 | 4/2011 | Faasse et al. |
| 2011/0240064 A1 | 10/2011 | Wales et al. |
| 2011/0250626 A1 | 10/2011 | Williams et al. |
| 2011/0290476 A1 | 12/2011 | Steele et al. |
| 2012/0003468 A1 | 1/2012 | Husemann et al. |
| 2012/0027986 A1 | 2/2012 | Husemann et al. |
| 2012/0029105 A1 | 2/2012 | Czerwonatis et al. |
| 2012/0097194 A1 | 4/2012 | McDaniel et al. |
| 2012/0171409 A1 | 7/2012 | Todt et al. |
| 2012/0205091 A1 | 8/2012 | Turley et al. |
| 2012/0205092 A1 | 8/2012 | Givens et al. |
| 2012/0205872 A1 | 8/2012 | Reinhardt et al. |
| 2012/0205873 A1 | 8/2012 | Turley et al. |
| 2012/0227389 A1 | 9/2012 | Hinderks et al. |
| 2012/0251823 A1 | 10/2012 | Maldonado et al. |
| 2012/0273236 A1 | 11/2012 | Gandikota et al. |
| 2013/0071535 A1 | 3/2013 | Fenyvesi et al. |
| 2013/0139727 A1 | 6/2013 | Constantz et al. |
| 2013/0190796 A1 | 7/2013 | Tilson et al. |
| 2013/0199732 A1 | 8/2013 | Niwa et al. |
| 2013/0256939 A1 | 10/2013 | Devenney et al. |

\* cited by examiner

APPLYING AN AGGREGATE TO EXPANDABLE TUBULAR

CROSS-REFERENCE TO RELATED APPLICATIONS

This application claims the benefit under 35 U.S.C. §119(e) of U.S. Provisional Patent Application No. 61/983,664, filed Apr. 24, 2014, the disclosure of which is hereby incorporated herein by reference.

STATEMENT REGARDING FEDERALLY SPONSORED RESEARCH OR DEVELOPMENT

Not Applicable.

BACKGROUND

1. Field of the Inventions

The present invention generally relates to applying an aggregate to an expandable tubular. More particularly, the present invention describes a method of applying aggregates on a flexible material to an expandable tubular.

2. Background of the Invention

In recent years, the use of expandable tubulars has become more common in the drilling and completion phases of well bore construction. Bits/aggregates are glued to the outside diameter of expandable tubular to act as anchors when expanded. For example, the bits/aggregates hold a liner in place. The liner/tubing is run down hole in the casing to the desired location and the liner/tubing is expanded until it seats against the casing. The high pressure of the expansion imbeds the bits/aggregates in both the liner and casing, which holds the liner in place.

In order for such anchoring devices to function properly, the entire circumference of the tubing in a specified length needs to be covered by bits/aggregates (as illustrated in FIG. 1). Such a length may vary, for example, from 3 to 12 inches. The bits/aggregates are generally small and are glued to the tubing/tubular. The size of the bits/aggregates may range from 0.062 to 0.250 inch. The bits/aggregates can have shapes as needed/specified. The glue can only use 50% of the height of the bit/aggregate for adhering it to the tubing. The glue typically begins to set in half an hour. The glue cannot sag or have runs and must be smooth over the surface of the tubing. A specified thickness must be consistent over the entire circumference of the tubing. It is also important to meet the requirement of bit/aggregate count per square inch, which is determined by the size of the bit. For example, a bit size of 0.062 to 0.125 inch could have a bit count of 25 to 36 pieces per square inch.

The glue and bits/aggregates must be applied on top of the tubing at a specific location. If the tubing is rolled, the bits/aggregates will fall off, or sag away and lose their spacing. Currently, the bits/aggregates must be applied one at a time. The bits/aggregates cannot touch each other. Applying the bits/aggregates is an arduous and time-consuming process that demands skill and experience. If the glue starts to cure, the bits/aggregates will not adhere. The aggregates/bits can be applied to only a small area of the tubular at one time. After the application of the bits/aggregates, the glue must be allowed to cure. For example, eight to ten hours is enough for the bits/aggregates to adhere and remain in place. Care must be taken not to touch the bits for 24 to 36 hours until the glue is fully cured. Then the next section of the tubular can be applied. This process is repeated until the entire circumference and required length is covered.

For example, on a tubing with four-inch outer diameter (OD), a one-inch area of the circumference and 12 inch long can be applied in one application. With bits being 0.125 inch long, 420 bits are needed for this area. Approximately 5040 bits are required for the entire application in this example.

Accordingly, there is continuing need and interest to develop methods and systems to apply aggregates to expandable tubulars.

SUMMARY

Herein disclosed is a method of applying at least one aggregate to a tubular, comprising attaching the at least one aggregate to a flexible sheet; wrapping the flexible sheet around the tubular with the at least one aggregate between the sheet and tubular.

In an embodiment, the flexible sheet is cut to a pre-determined size. In an embodiment, attaching the at least one aggregate to a flexible sheet comprises adhering the at least one aggregate to the sheet using a first adhesive. In an embodiment, the first adhesive is allowed to cure. In an embodiment, a second adhesive is applied to the outside diameter of the tubular before wrapping the flexible sheet around the tubular, wherein the second adhesive has a higher adhering strength than the first adhesive. In an embodiment, the second adhesive is applied until a specified thickness is achieved. In an embodiment, the second adhesive is applied 360° around the tubular. In an embodiment, the second adhesive is allowed to cure after wrapping the flexible sheet around the tubular. In an embodiment, the sheet is radially pressed against the tubular (to ensure that the at least one aggregate is firmly attached/applied to the tubular).

In an embodiment, the sheet is removed and the at least one aggregate remains applied to the tubular. In an embodiment, a coat of the second adhesive is sprayed to where the at least one aggregate is applied to the tubular. In an embodiment, a multiplicity of sheets are used to apply aggregates to the tubular at multiple locations. In an embodiment, the tubular is an expandable tubular and the at least one aggregate anchors the tubular when the tubular is expanded.

Herein also disclosed is an assembly comprising a tubular, at least one aggregate, and a flexible sheet wrapped around the tubular with the at least one aggregate between the tubular and the sheet. In an embodiment, the at least one aggregate is adhered to the sheet by a first adhesive and the at least one aggregate is adhered to the tubular by a second adhesive, wherein the second adhesive has a higher adhering strength than the first adhesive.

In an embodiment, the flexible sheet is removed and the at least one aggregate remains attached to the tubular. The use of such an assembly is discussed. In an embodiment, the tubular is an expandable tubular and the at least one aggregate anchors the tubular when the tubular is expanded.

Further disclosed is another assembly comprising a tubular, aggregates, and a multiplicity of flexible sheets wrapped around the tubular at multiple locations with the aggregates between the tubular and the sheets, wherein the aggregates are adhered to the sheets by a first adhesive and the aggregates are adhered to the tubular by a second adhesive, wherein the second adhesive has a higher adhering strength than the first adhesive. In an embodiment, the flexible sheets are removed and the aggregates remain attached to the tubular. The use of such an assembly is discussed.

The present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION

Overview.

To apply aggregates to an expandable tubular, a two-step process/procedure is used, wherein the aggregates bits are applied to a strong, flexible sheet of material and then the bits and material are attached to the tubular. The material is cut to the specified length of the aggregate area and the width of the diameter of the tubing. The sheet is coated with glue that has a holding strength less than (e.g. 50% less than) the adhesive used on the tubing, but the glue is strong enough to securely adhere the bits to the material. The bits are applied to the glued material in the pattern and density as specified (for example, by the customer). There are several methods to apply the bits to achieve the correct distribution. Once the sheet with the bits is dry, a stronger adhesive is applied to the entire OD of the tubing at the specified location and at the desired thickness. Before the stronger adhesive can cure, the material with the bits is wrapped tightly around the tubing. The tubular and the sheet with the bits are firmly wrapped (e.g., in rubber material) to ensure the bits are pushed to touch the tubular across the entire surface. Other sites along the tubing may be done at the same time. The adhesive is allowed to cure for 24-36 hours. The wrapping and the sheet are then removed, leaving the bits properly embedded in the adhesive.

As used herein, the term "tubular" refers to any tubular parts or components, especially related to the oil/gas/water well applications and downhole processes. Examples of such tubulars include a casing, a tubing, a liner, a screen, or a production tubing.

As used herein, the terms "aggregates" and "bits" are interchangeable. Such aggregates/bits include industrial diamonds, carbide balls or crushed carbide, or any material harder than the tubular as known to one skilled in the art. They include all sizes and shapes.

As used herein, the terms "sheet" refers to is a flexible material, to which the aggregates/bits are attached/glued before being applied to a tubular.

Figure 1:
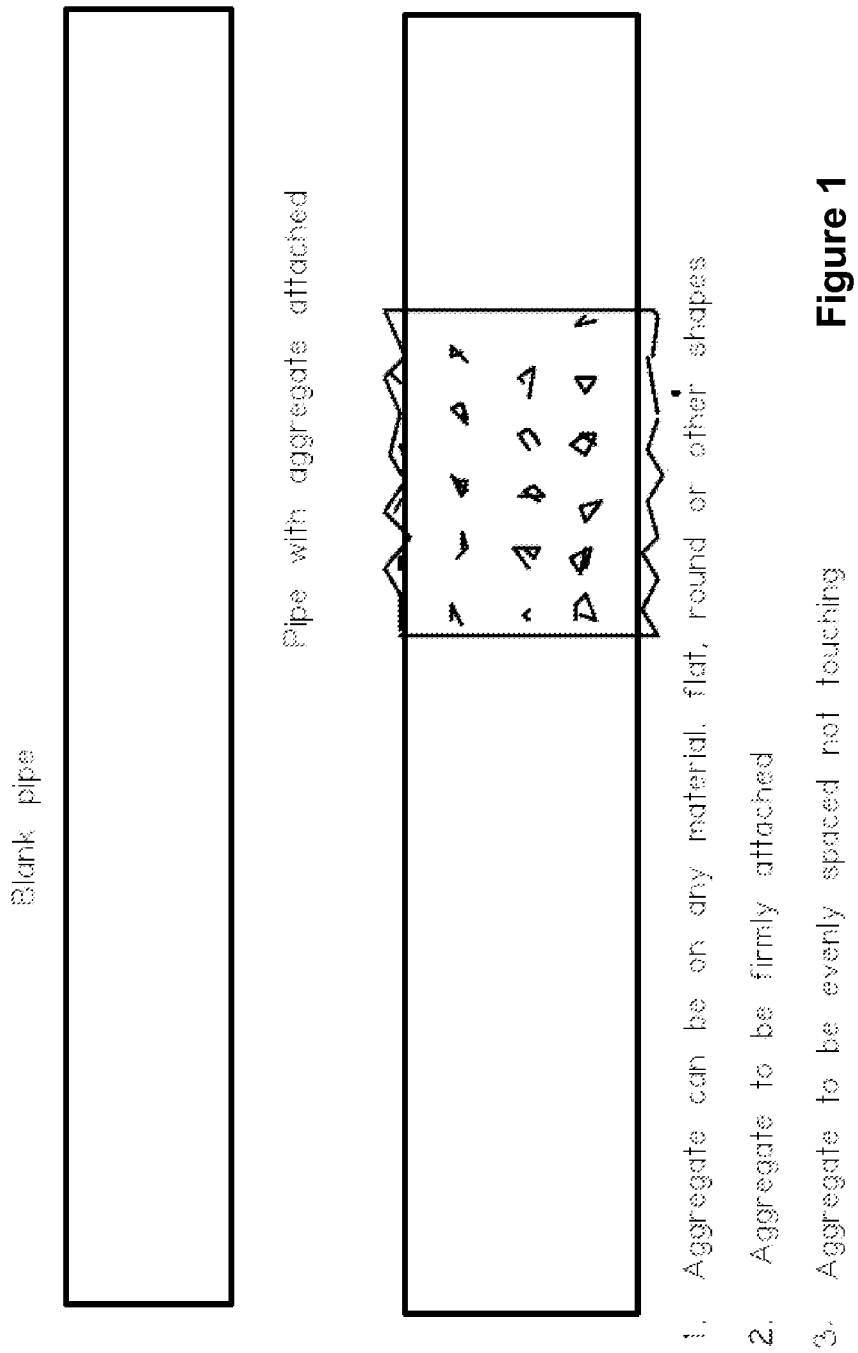
FIG. 1 illustrates a blank tubular (pipe or tubing) and a tubular with an aggregate attached.
Figure 2:
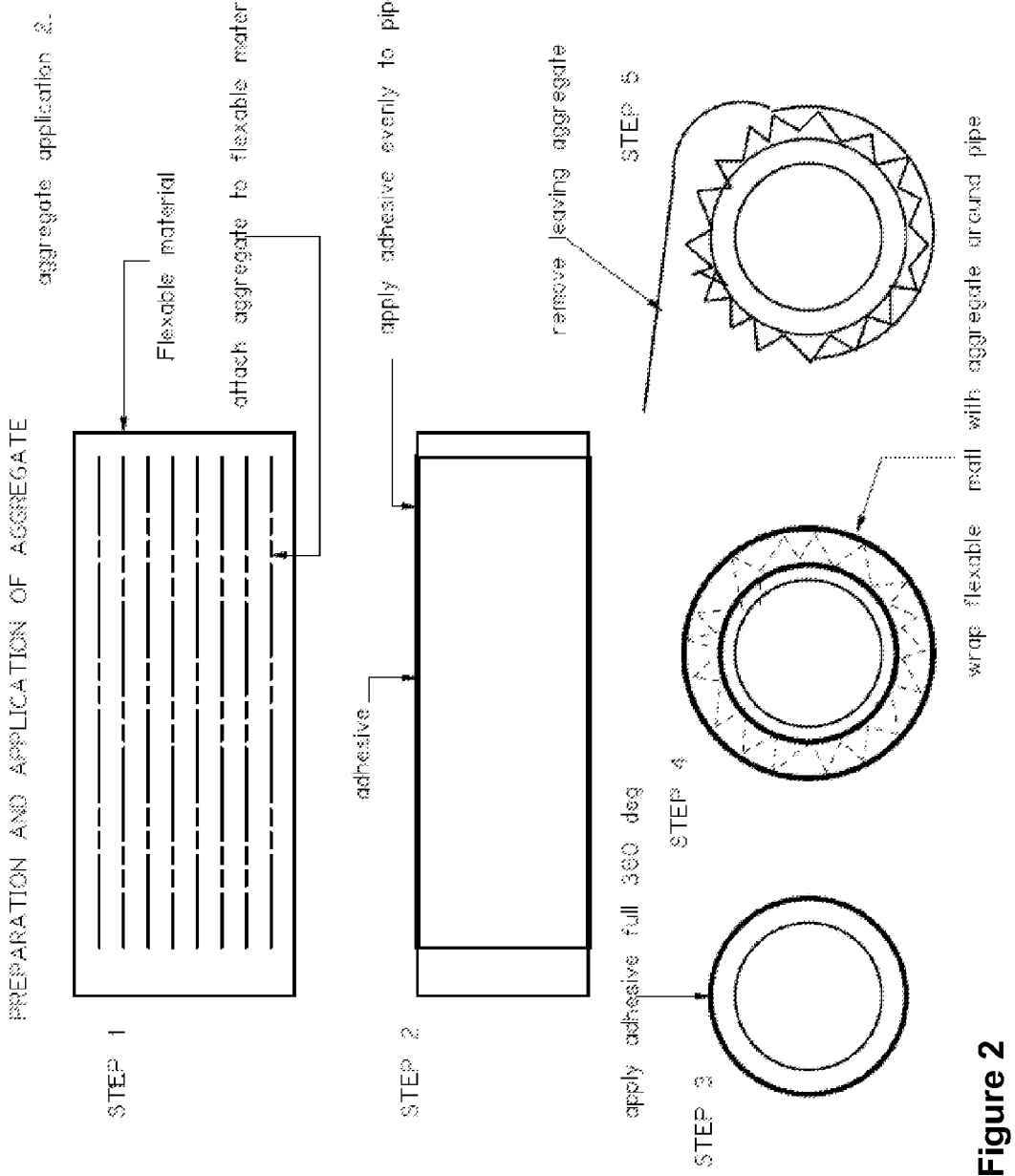
FIG. 2 illustrates a method of applying aggregates to an expandable tubular, according an embodiment of this disclosure.

The method of applying aggregates to a tubular is now discussed in a more detailed fashion. In an embodiment, as illustrated by FIG. 2 (Step 1), a strong flexible material (sheet) is cut to proper dimensions to cover the OD and length of the specified area on the tubular where the bits are to be applied. Such flexible material is able to wrap around the tubular and does not tear easily. The bits are glued to the sheet using a first adhesive/glue. In some cases, the bits are spaced to the customer's specification. In some cases, the glue is allowed 12 hours to cure.

In Step 2, a second adhesive/glue is applied to the outside diameter of the tubular to the specified thickness for the bit. The second adhesive/glue has a higher adhering strength than the first adhesive/glue. (For example, the second adhesive tubing is 50% stronger then the first.)

In Step 3, the second adhesive is applied to the entire circumference of the tubular.

In Step 4, the sheet with the attached bits is wrapped around the tubular and rubber bands are wrapped around the sheet to press it against the tubular.

In Step 5, the second adhesive is allowed to cure 24 to 36 hours. The rubber bands are removed. The sheet is removed and the bits/aggregates are attached/applied to the tubular.

In some cases, after inspecting the attached bits, the adhesive is thinned using a specified reducer. The entire area of bits is sprayed with a light coat of the second adhesive. This allows the adhesive to penetrate air spaces around the bits. This helps to guarantee the holding strength of the adhesive. In some embodiments, the bits are wire brushed to remove the adhesive on the bit that is above the base glue.

Advantages.

If the following parameters are know: tubing diameter and length of the aggregate area, the density and size of the aggregate, the sheets may be created ahead of time. If a few sizes are standardized, an inventory of aggregate sheets could be created to reduce the preparation time for applying aggregates to tubulars.

Because the aggregates are applied to the tubular on one piece of sheet, a tubular with multiple locations along the length may be done in one session, thus significantly reducing the time and cost to apply the aggregates. In some cases, the reduced time are a few days.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method of applying at least one aggregate to a tubular, comprising
    attaching said at least one aggregate to a flexible sheet, wherein attaching said at least one aggregate to said flexible sheet comprises adhering the at least one aggregate to said sheet using a first adhesive;
    wrapping the flexible sheet around said tubular with the at least one aggregate between said sheet and said tubular.

2. The method of claim 1 comprising cutting the flexible sheet to a pre-determined size.

3. The method of claim 1 comprising allowing the first adhesive to cure.

4. The method of claim 1 comprising applying a second adhesive to the outside diameter of the tubular before wrapping the flexible sheet around said tubular, wherein the second adhesive has a higher adhering strength than the first adhesive.

5. The method of claim 4 wherein the second adhesive is applied until a specified thickness is achieved.

6. The method of claim 4 wherein the second adhesive is applied 360° around the tubular.

7. The method of claim 4 comprising allowing the second adhesive to cure after wrapping the flexible sheet around said tubular.

8. The method of claim 1 comprising radially pressing the sheet against the tubular.

9. The method of claim 1 comprising removing the sheet, wherein the at least one aggregate remains applied to the tubular.

10. The method of claim 9 comprising spraying a coat of the second adhesive to where the at least one aggregate is applied to the tubular.

11. The method of claim 1 wherein a multiplicity of sheets are used to apply aggregates to the tubular at multiple locations.

12. The method of claim 1 wherein said tubular is an expandable tubular and the at least one aggregate anchors the tubular when the tubular is expanded.

13. An assembly comprising a tubular, at least one aggregate, and a flexible sheet wrapped around said tubular with the at least one aggregate between the tubular and the sheet, wherein the at least one aggregate is adhered to the sheet by a first adhesive and the at least one aggregate is adhered to the tubular by a second adhesive, wherein the second adhesive has a higher adhering strength than the first adhesive.

14. The assembly of claim 13 wherein the flexible sheet is removed and the at least one aggregate remains attached to the tubular.

15. The assembly of claim 14 wherein said tubular is an expandable tubular and the at least one aggregate anchors the tubular when the tubular is expanded.

16. An assembly comprising
    a tubular, aggregates, and a multiplicity of flexible sheets wrapped around said tubular at multiple locations with the aggregates between the tubular and the sheets,
    wherein the aggregates are adhered to the sheets by a first adhesive and the aggregates are adhered to the tubular by a second adhesive, wherein the second adhesive has a higher adhering strength than the first adhesive.

17. The assembly of claim 16 wherein the flexible sheets are removed and the aggregates remain attached to the tubular.

\* \* \* \* \*